(12) United States Patent
Torres (10) Patent No.: US 11,032,121 B1
(45) Date of Patent: Jun. 8, 2021

(54) SYSTEM AND METHOD FOR COMPRESSION OF RF IQ DATA

(71) Applicant: Palo Alto Research Center Incorporated, Palo Alto, CA (US)

(72) Inventor: Francisco E. Torres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/021,795

(22) Filed: Sep. 15, 2020

(51) Int. Cl.
| | |
|---|---|
| *H04L 27/38* | (2006.01) |
| *H04L 27/34* | (2006.01) |
| *H04W 24/10* | (2009.01) |
| *H04B 1/04* | (2006.01) |
| *H04B 17/318* | (2015.01) |

(52) U.S. Cl.
CPC ....... *H04L 27/3863* (2013.01); *H04B 1/0475* (2013.01); *H04B 17/318* (2015.01); *H04L 27/3483* (2013.01); *H04W 24/10* (2013.01)

(58) Field of Classification Search
CPC ............. H04L 27/3854; H04L 27/3863; H04L 27/3472; H04L 27/3483; H04W 24/00; H04W 24/08; H04W 24/10; H04B 1/04; H04B 1/0466; H04B 1/0475; H04B 17/00; H04B 17/309; H04B 17/318; H04B 10/07; H04B 10/0773; H04B 10/0775; H04B 10/07955
See application file for complete search history.

(56) References Cited

U.S. PATENT DOCUMENTS

| | | | |
|---|---|---|---|
| 2010/0238862 A1* | 9/2010 | Davidson | H04W 4/029 370/328 |
| 2016/0023675 A1* | 1/2016 | Hannah | G05D 1/0011 701/2 |
| 2017/0094631 A1* | 3/2017 | Pon | G01S 5/0244 |
| 2020/0041606 A1* | 2/2020 | Jones | H04W 4/021 |

\* cited by examiner

*Primary Examiner* — Siu M Lee
(74) *Attorney, Agent, or Firm* — Shun Yao; Park, Vaughan, Fleming & Dowler LLP (57) ABSTRACT

One embodiment provides a system for detecting and reporting information associated with RF signals. The system obtains in-phase and quadrature (IQ) data of the RF signals received at a predetermined center frequency and computes statistics associated with time-dependent changes of the IQ data. Computing the statistics includes: placing IQ data points included in the IQ data into a plurality of bins in an IQ plane; computing, for each IQ data point, a change in position in the IQ plane between the IQ data point and a corresponding IQ data point recorded prior to a predetermined time interval; and computing, for each bin, an average change in position of IQ data points inside the bin. The system assembles a data packet to be transmitted over a bandwidth-limited communication channel. The data packet includes a small number of bits representing the computed statistics associated with the time-dependent changes of the IQ data.

20 Claims, 10 Drawing Sheets

SYSTEM AND METHOD FOR COMPRESSION OF RF IQ DATA

BACKGROUND

Field

This disclosure is generally related to processing and transmission data associated with detected radio frequency (RF) signals. More specifically, this disclosure is related to a system and method that creates compact data packets for reporting information associated with detected RF signals.

Related Art

To enable persistent maritime situational awareness over large ocean areas, the Ocean of Things project deploys thousands of small, low-cost floats that form a distributed sensor network in the ocean. Each smart float contains a number of sensors to collect environmental data (e.g., sea surface temperature, sea state, and location) as well as activity data about commercial vessels, aircraft, and even marine mammals moving through the area. The floats transmit data periodically via satellite to a cloud network for storage and real-time analysis.

Various types of human activities (e.g., commercial vessels, aircraft, etc.) often involve RF signals (e.g., communications among the vessels or aircraft). The low-cost floats in the ocean can detect RF signals and report information associated with the detected RF signals. Such information can be useful in monitoring the human activities.

Because the sources and modulation formats of the RF signals detectable in the ocean may not be known beforehand, it is desirable to configure the floats to detect RF signals over a wide frequency range and with a high sampling rate. Also, because the floats are often far from receiving stations (e.g., terrestrial cell towers), it is desirable to send information about the detected RF signals through satellite communications, such as Iridium satellite communications. The message sizes for such communications are often kept small (e.g., certain Iridium modems are capable of transmit data burst of less than 270-340 bytes, and a different set of Iridium satellite modems can transmit data packets of size less than 1890-1960 bytes). In contrast, raw RF data over a broad spectrum of frequencies and at a high sampling rate can be quite large, making it difficult to directly transmit the raw RF data.

SUMMARY

One embodiment provides a system and method for detecting and reporting information associated with radio frequency (RF) signals. During operation, the system obtains in-phase and quadrature (IQ) data of the RF signals received at a predetermined center frequency by an RF receiver and computes statistics associated with time-dependent changes of the IQ data. Computing the statistics can include: placing IQ data points included in the IQ data into a plurality of bins in an IQ plane; computing, for each IQ data point, a change in position in the IQ plane between the IQ data point and a corresponding IQ data point recorded prior to a predetermined time interval; and computing, for each bin, an average change in position of IQ data points inside the bin. The system further assembles a data packet to be transmitted over a bandwidth-limited communication channel. The data packet includes a small number of bits representing the computed statistics associated with the time-dependent changes of the IQ data.

In a variation on this embodiment, the change in position can include: a distance between the IQ data point and the corresponding IQ data point recorded prior to the predetermined time interval, and a direction pointed to the IQ data point from the corresponding IQ data point. The average change in position for each bin can include an average distance and an average direction.

In a further variation, computing the statistics associated with the time-dependent changes of the IQ data can include, for each bin, computing a standard deviation of the distance associated with the IQ data points in the bin.

In a further variation, the system can further generate a bit string to represent statistics associated with the time-dependent changes of the IQ data points in a respective bin. The bit string includes one or more of: a first set of bits representing the average distance, a second set of bits representing the standard deviation of the distance, and a third set of bits representing the average direction.

In a further variation, the first set of bits can include a single bit indicating whether the average distance is greater or less than a first predetermined threshold, the second set of bits can include a single bit indicating whether the standard deviation of the distance is greater or less than a second predetermined threshold, and the third set of bits can include three bits indicating an angle value associated with the average direction.

In a variation on this embodiment, determining the center frequency can include performing a wideband RF power measurement to locate a peak and performing a narrowband RF power measurement around the peak and analyzing the narrowband measurement results to determine a center frequency of interest.

In a variation on this embodiment, the RF receiver resides on a floating device floating in an ocean, and the bandwidth-limited communication channel comprises a satellite communication channel.

In a variation on this embodiment, a remote server receives, over the bandwidth-limited communication channel, the data packet and presents, on a display, a visual representation of the IQ data based on information included in the data packet.

In a further variation, the remote server applies a machine-learning technique to derive information regarding a source of the RF signals based on the visual representation of the IQ data.

In a further variation, the visual representation can include one or more of: a color map representing the density information associated with the distributions of the IQ data points in the IQ plane and one or more geometric shapes representing the statistics associated with the time-dependent changes of the IQ data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

This disclosure is about detecting and reporting IQ data of RF signals. In order to describe how the IQ data changes with time, the concept of the "motion" of an IQ data point is introduced. More specifically, each IQ data point is represented by a point (referred to as an IQ point) in a two-dimensional (2D) plane (referred to as an IQ plane). As the IQ data points are recorded one at a time according to a predetermined sampling rate, the change in location on the IQ plane between an IQ point recorded at the last time step and an IQ point recorded at the current time step can be used to represent the "motion" or "movement" of the IQ point (as if the IQ point "moves" from its previous location to its current location in one time step). The motion of an IQ point can be defined by a distance and a direction. The distance associated with an IQ point refers to the distance the IQ point travels on the IQ plane from its previous location (i.e., the location of an IQ point recorded at the previous time step) to its current location, and the direction refers to the direction pointing from the previous location to the current location.

The embodiments described herein solve the problem of creating compact data packets to report detected RF signals for transmission over communication channels with extremely limited bandwidth (e.g., satellite communication channels). To report information associated with RF signals detected around a particular center frequency, one can represent the detected RF signals using the time-varying in-phase and quadrature (IQ) data. More specifically, the two-dimensional (2D) IQ plane can be divided into a number (e.g., 12×12) of bins, and the IQ points can be placed into corresponding bins. For each bin, the system can use a small number of bits to represent motion data of the IQ points in the bin, including a first set of bits describing the motion distances (e.g., the average distance of all IQ points in the bin and the standard deviation of the distance) and a second set of bits describing the motion directions. In one example, the system can use five bits to describe the motions of IQ points in a bin, with a first bit indicating whether the average distance is greater than a threshold, a second bit indicating whether the standard deviation of the distance is greater than a threshold, and three following bits indicating the average angle of the motion direction. Using a small number of bits to describe motions (i.e., changes over time) of multiple IQ data points allows for a compact representation of the IQ data, making it possible to use a small packet to transmit the IQ data (more particularly, information regarding the time-dependent changes of the IQ data) along with the center frequency to a destination via a bandwidth-limited channel. Moreover, the IQ data can be visually represented using certain visual tools (e.g., 2D color maps) to facilitate an analyst (human or artificial intelligence) in understanding the nature of the RF signals (e.g., obtaining information regarding the source of the RF signal) quickly.

Distributed RF Signal Detecting and Reporting System

Figure 1:
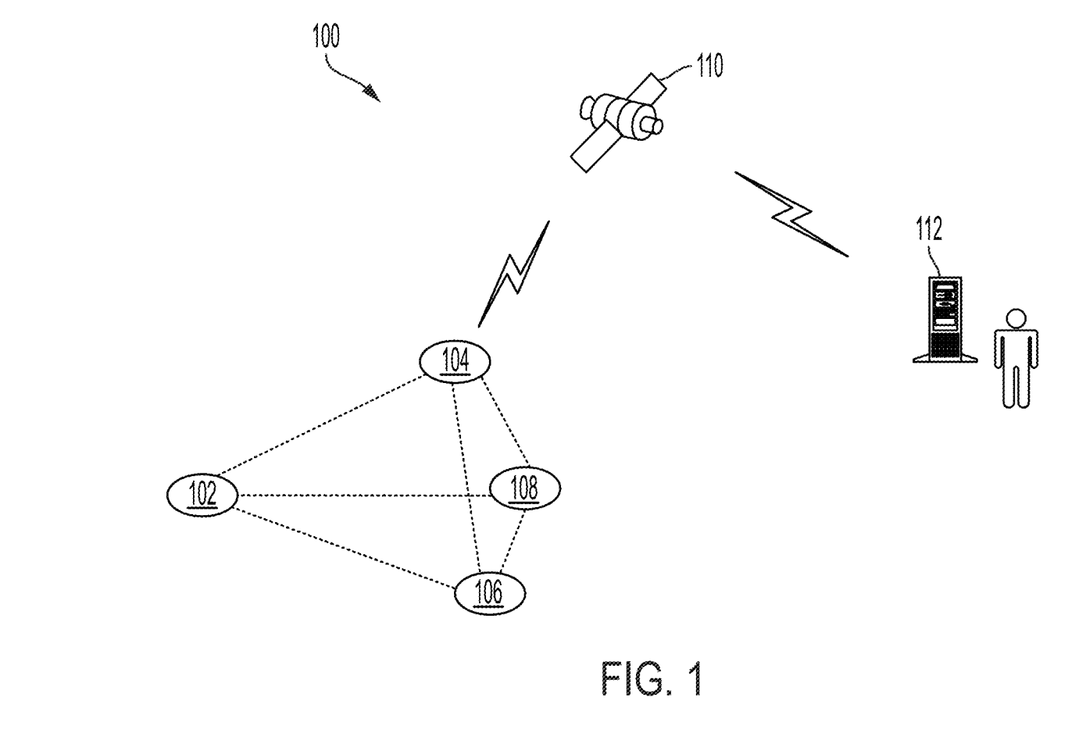
FIG. 1 illustrates an exemplary distributed RF signal detecting and reporting system, according to one embodiment.

FIG. 1 illustrates an exemplary distributed RF signal detecting and reporting system, according to one embodiment. Distributed RF signal detecting and reporting system 100 can include a number of RF signal detecting and reporting modules (e.g., modules 102-108). Each module can include one or more RF receivers configured to receive RF signals in their surroundings and a signal analyzer configured to obtain IQ data of the received RF signals. At any given time, an IQ data point can provide magnitude and phase information of the RF signals. Each module can also include a message generator configured to generate a message that includes information associated with the obtained IQ data and a transmitter configured to transmit the message.

In one exemplary embodiment, the RF signal detecting and reporting modules can be respectively located on a number of floating devices scattered in a large ocean area. As discussed previously, such floating devices can be used to collect various types of environmental data as well as information related to human activities. A floating device can include, in addition to the RF signal detecting and reporting module, other sensor devices (e.g., temperature sensor, motion sensor, etc.).

Being in the middle of the ocean means that floating devices are far away from any receiving station on land. Consequently, messages that include information of the received RF signals are transmitted to satellites (e.g., satellite 110) before they can be received by a remote computing device 112 to allow a user of computing device 112 to analyze the RF signals. Because the RF signals are results of human activities, analyzing the RF signals can provide information about such human activities.

Typical satellite-based communication channels have limited bandwidths, and transmitting large amounts of data can be costly. On the other hand, information about the RF signals can be data-intensive, especially the time-dependent information about the RF signals. One way to represent an RF signal is with its IQ constellation data, which can provide information about whether the RF signal results from engineered communications (i.e., non-random) or unstructured bursts of RF energy. Although static IQ constellation data (which only provides density information of the IQ points) can provide certain information regarding the modulation scheme, information regarding the variations in time of the IQ data can be very useful in providing additional information about the RF signal. However, communicating the actual IQ values as a function of time is not feasible in situations where the communication channel has a limited bandwidth (e.g., when the IQ data is recorded on floating devices in the ocean). In the bandwidth-limited situations, it is desired to generate a compact message that can include information regarding how the IQ data changes over time.

Time-dependent information in the IQ data can include motion data, or more particularly, the change in location in the IQ plane between consecutively recorded IQ points. To reduce the size of the IQ-data-reporting message (or simply the reporting message), in some embodiments, instead of reporting the motion of every single IQ point, the system can report the average motion of a group of IQ points. More specifically, the 2D IQ plane can be divided into a number of bins and the motion statistics of IQ points within each bin can be reported using a limited number of bits to enable the creation of a compact message. In some embodiments, motion statistics associated with IQ points in each bin can include the average distance, the average direction, and the standard deviation of the distance. As discussed previously, the distance associated with an IQ point refers to the distance the point travels in the IQ plane during the time step before the point is recorded in the particular bin. The distance in fact reflects the amount (or the magnitude) of the change of the IQ data in a predetermined time interval. The direction indicates the direction of such change.

The predetermined time interval used to measure the changes of the IQ data can be determined by the IQ data sampling rate (i.e., the rate the IQ data is recorded). Such a time interval can be configurable depending on the practical need. In some embodiments, the time interval for measuring the IQ data change in time can be the same as the time interval for recording the IQ data. However, for IQ data that changes very slowly with time, the system can use a time interval significantly larger than the sample time to report the time-dependent changes of the IQ data.

Figure 2:
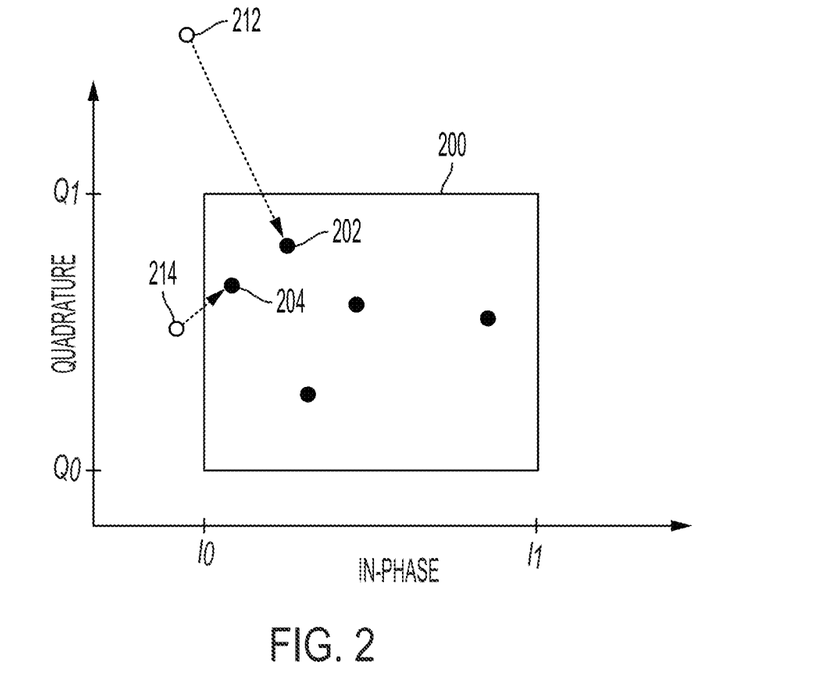
FIG. 2 illustrates an exemplary IQ bin, according to one embodiment.

FIG. 2 illustrates an exemplary IQ bin, according to one embodiment. An IQ bin 200 in the 2D IQ plane covers an area where I is between $I_0$ and $I_1$ and Q is between $Q_0$ and $Q_1$. In the example shown in FIG. 2, bin 200 is a square. In practice, the IQ bins can also be rectangular. In FIG. 2, bin 200 can include a number of IQ points, such as points 202 and 204. At the time step right before IQ point 202 is recorded, an IQ point 212 is recorded. Hence, the motion associated with IQ point 202 corresponds to the vector pointing from point 212 to point 202. Similarly, at the time step right before IQ point 204 is recorded, an IQ point 214 is recorded, meaning that the motion associated with IQ point 204 corresponds to the vector pointing from point 214 to point 204. Note that this time step can be the IQ sampling interval or multiples of the IQ sampling interval.

In the example shown in FIG. 2, IQ data bin 200 includes five IQ points, meaning that one may need five vectors with different magnitudes and directions to describe motions of all points in IQ data bin 200 (i.e., changes in locations of these IQ points with regard to their corresponding previous IQ points). To reduce the amount of data used for reporting the motions of the IQ points and, hence, the size of the reporting message, a statistical approach can be implemented. For example, the five vectors can be averaged, and the averaged result can be included in the reporting message. More specifically, to more accurately describe the motions, the magnitudes and directions of the vectors can be separately averaged. The average magnitude of the vectors corresponds to the average distance the points travelled on the IQ plane right before they arrived at bin 200; and the average direction of the vectors corresponds to the average direction the points travelled. Note that, when the RF signal is sampled over a long enough time, the IQ data can be observed to land inside certain bins multiple times. The presence of various types of noise often prevents the exact overlapping of the IQ points, causing these IQ points to be scattered within a bin.

In some embodiments, when computing the distances an IQ point travels, the system can scale the measurement result using the size (e.g., the length of each side) of the bin. In the example shown in FIG. 2, each side of bin 200 can have a length of $I_1$-$I_0$ or $Q_1$-$Q_0$, which can be referred to as a unit length. The distance of each point (i.e., the distance travelled by each point right before the point arrives at the current location in bin 200) can be measured using the unit length. For example, the distance of point 202 can be roughly 1 unit length, while the distance of point 204 can be roughly 0.3 unit lengths. On the other hand, the direction of each point (i.e., the direction in which each point travels before the point arrives at the current location) can be represented using an angle with respect to a predetermined direction (e.g., the horizontal direction).

To further reduce the amount of data needed to represent the motions of the IQ points, in some embodiments, the average distance of IQ points in a bin can be represented in a binary form as being above or below a predetermined threshold value. This way, a single bit (referred to as the distance bit) can be included in the reporting message to represent the average distance of IQ points in the bin. For example, if the bit value is "0," it indicates that the average distance of the points within the bin is lower than a predetermined threshold value; if the bit value is "1," it indicates that the average distance of the points within the bin is greater than a predetermined threshold value. In some embodiments, the predetermined threshold value can be one unit length. Note that, other than binary encoding, the average distance can also be encoded using multiple bits (e.g., two or three bits) to describe the distance at a higher resolution. Depending on the limit in the message size and the number of bins, the system can dynamically determine the distance resolution. For example, if 100 bytes can be allocated to report the average distance of 100 IQ bins, the average distance of each IQ bin can be represented using one byte (i.e., eight bits) of data. If more bins are needed, the number of bits used for the average distance can be reduced to limit the size of the reporting message.

In addition to the average distance, to provide additional information regarding the variation of the distances of IQ points in a bin, the standard deviation of the distance can also be included in the reporting message. In some embodiments, the standard deviation of the distance can be similarly represented using a single bit, with "0" indicating that the standard deviation is less than a predetermined threshold value and "1" indicating that the standard deviation is more than the predetermined threshold value. In one embodiment, the predetermined threshold value of the standard deviation of the distance can be one and a half times of the average distance of points in the bin. Similarly, the number of bits used to represent the standard deviation of the distance can be configured based on practical need.

As discussed previously, information associated with motions of the IQ points can also include directions of the IQ points, and such directions can be represented using angles. In some embodiments, to reduce the size of the reporting message, the angle values can be discrete to allow a relatively small number of bits to represent each angle value. In one embodiment, three bits can be used to represent eight angle values (e.g., 0, $\pi/4$, $\pi/2$, $3\pi/4$, ..., $7\pi/4$). In one example, "000" represents an angle vale of 0, "001" an angle value of $\pi/4$, "010" an angle value of $\pi/2$, etc. The angle of each motion vector can be approximated to one of the eight angle values. Different notations may be used. For example, the eight angle values may refer to angle values between $-\pi$ and $\pi$ (e.g., $-\pi$, $-3\pi/4$, $-\pi/2$, $-\pi/4$, 0, $\pi-4$, $\pi/2$, and $3\pi/4$). Other than using three, the system can also use fewer or more bits to represent the angle. A longer bit string can provide a higher angle resolution.

Using this approach, motion data of IQ points in each bin can be represented using only five bits, thus significantly reducing the size of the reporting message. For example, if there are 12×12=144 bins, the number of bits required to represent the IQ motion data only needs to be 720 bits or 90 bytes. Such data can easily fit into a 340-byte message to be transmitted over a satellite communication link. If the allowable size of the message is increased, the number of bins and/or the number of bits used to represent motion statistics of each bin can also be increased.

Generating IO-Data-Reporting Messages

Figure 3:
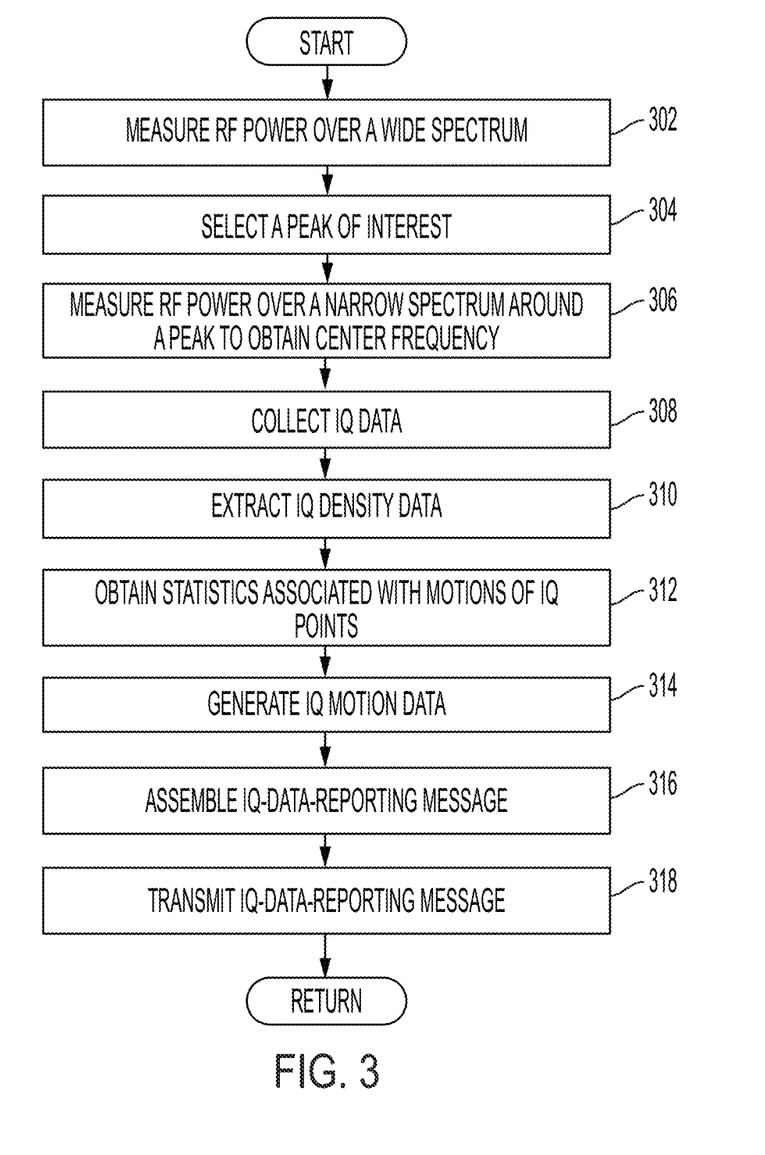
FIG. 3 presents a flowchart illustrating an exemplary process for generating an IQ-data-reporting message, according to one embodiment.

FIG. 3 presents a flowchart illustrating an exemplary process for generating an IQ-data-reporting message, according to one embodiment. During operation, a wideband RF power measurement module measures RF power in its surrounding environment over a wide spectrum range (operation 302). In some embodiments, the RF power measurement module can be installed on a floating device floating in the ocean and can be configured to measure RF power in its surroundings. In one embodiment, the RF power measurement module can include a low-cost spectrum analyzer. Based on the measured power spectrum, the system can select a peak of interest (operation 304). Various criteria can be used for selecting the peak. For example, when multiple spectral peaks exist, the strongest peak can be selected. Alternatively, a peak that has not been analyzed yet or a peak that is around a particular frequency can be selected. When there is no significant peak, the system may select a frequency range of interest to narrow into in an ad hoc manner.

Subsequent to selecting a peak, the system can further perform a narrow band spectrum measurement around the peak (operation 306). Such a measurement can be performed at a higher frequency resolution to more accurately determine the center frequency of the peak. The system can then use the determined central frequency to collect IQ data over a predetermined time period (operation 308). In some embodiments, a low-cost software-defined radio (SDR) receiver (e.g., an RTL-SDR receiver) can be used to obtain the IQ data at the particular center frequency. The IQ data will include a sequence of IQ data points, with each IQ data point indicating the measured I and Q values at a given time. The order of the IQ data points can be based on the time they are recorded.

Figure 4:
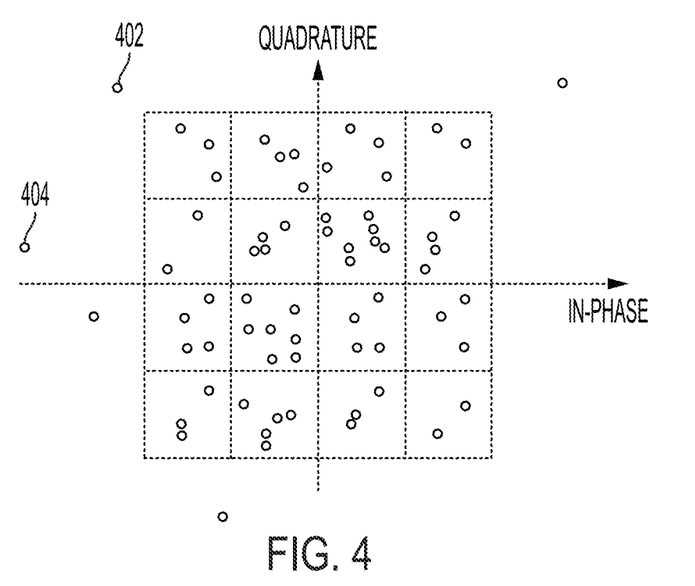
FIG. 4 illustrates the exemplary binning of measured IQ points, according to one embodiment.

From the obtained IQ data, the system can first extract IQ density data (operation 310). The IQ density refers to the density of the IQ points on the 2D IQ plane. In some embodiments, a selected area in the 2D IQ plane can be divided into a number of bins, and the IQ points are placed within the corresponding bins based on the I and Q values. The IQ density data can be computed by counting the number of IQ points in each bin. FIG. 4 illustrates the exemplary binning of measured IQ points, according to one embodiment.

In FIG. 4, the central area of the IQ plane can be divided into an array of 4×4 bins, and the IQ points are scattered in the individual bins. Note that, in addition to the IQ points in the bins, there are also a number of IQ points falling outside of all the bins (e.g., IQ points 402 and 404). However, because these points are sparsely scattered, they can be ignored in the density data. In some embodiments, when dividing the IQ plane into a number of bins, the system takes into consideration the scattering pattern of the IQ points, selects an area where most IQ points are located, and divides the selected area into a number of bins. The number and size of the bins can be determined based on practical needs, such as resolution and size limit of the reporting message. A larger area and a larger number of bins can increase the resolution but can also increase the amount of data to be included in the reporting message. In addition, in the example shown in FIG. 4, all bins are squares with an equal size. In practice, other ways to divide the selected area into bins are also possible. For example, instead of squares, the bins may be rectangles. Moreover, in some embodiments, the bins may have different sizes. For example, the system may adaptively divide the selected area into bins based on the density of the IQ points. At locations where IQ points are densely scattered, the system can create bins with a smaller size, and larger bins can be created at locations having a lower density of IQ points.

Based on the bins, the system can compute the IQ density data. More specifically, the system can count the number of IQ points in each bin and generate a 2D array, with each array element being the number of IQ points in the corresponding bin. In the example shown in FIG. 4, the 2D IQ density array can be: {[3, 4, 4, 2], [2, 4, 8, 4], [4, 7, 4, 3], [3, 5, 3, 2] }, with each row in the density array corresponding to a row of bins. The IQ density data can provide static or time-independent information (e.g., possible modulation schemes) regarding the RF signals. On the other hand, dynamic data associated with the motions of the IQ points can provide additional information regarding the RF signals.

Returning to FIG. 3, subsequent to extracting the IQ density data, the system can obtain, for each bin, statistics associated with the motions of the IQ points in the bin (operation 312) and generate IQ motion data based on the statistics (operation 314). In some embodiments, the motion statistics for a particular bin can include information associated with the average distance travelled by the points in the bin right before they enter the bin. The distance travelled by an IQ point refers to the distance between the current IQ point in the bin and an IQ point that is recorded one time step right before the current IQ point. Note that, in the original IQ data, adjacent data points are recorded one time step away, meaning that the distance associated with an IQ point can be the distance between this IQ point and a previous IQ point in the IQ data. Such a distance can be averaged over all IQ points in the bin to determine the average motion or distance of the bin. In one embodiment, the average motion data can be a single bit that indicates whether the average distance of the bin is greater or less than a predetermined threshold. The threshold can be determined based on practical needs. In one embodiment, the system may compute the average distance for all recorded IQ points or for IQ points in all bins and use such average distance as the threshold.

In addition to the average motion data, the motion statistics can also include the standard deviation of the motion of the IQ points in each bin. In one embodiment, the system can use a single bit to indicate whether the standard deviation of the motion of the IQ points in each bin is greater or less than a predetermined threshold value. In some embodiments, such a threshold can be a fixed value. In alternative embodiments, such a threshold can be adaptive. For example, for each bin, the threshold for the deviation of the motion of the IQ points in a particular bin can be correlated with the average of the motion of the IQ points in that bin. In one embodiment, the standard deviation of the distance of the IQ points in a bin can be 1.5×avg (distance), where avg (distance) is the average distance of all IQ points in the bin.

Directional information associated with the motion of the IQ points can also be part of the motion statistics. In some embodiments, the directional information of a particular bin can include the average angle of the motions of the IQ points in that particular bin. In a further embodiment, the average angle can be approximated to one of the eight angles evenly spaced between 0 and $2\pi$ to allow the average angle to be represented using only three bits.

Accordingly, the IQ motion data for a particular bin can include three portions, with the first portion being the average distance, the second portion being the standard deviation of the distance, and the third portion being the average angle. In one embodiment, the three portions can include five bits, with the first bit indicating whether the average distance is greater or less than a certain threshold, the second bit indicating whether the standard deviation of the distance is greater or less than a certain threshold, and the following three bits representing the average angle of the motion approximated to the nearest one of eight angle values. Hence, the IQ motion data for the detected RF signals can be obtained by combining the motion data for all the bins to obtain a 2D array, with each array element being the 5-bit IQ motion data of a corresponding bin. Using the bins shown in FIG. 4 as an example, the IQ motion data can be: {[11101, 11100, 10110, 01101], [11111, 01110, 10110, 01010], [11000, 11110, 01110, 10101], [10110, 01101, 00110, 00000]}. As one can see, this allows the IQ motion information to be included in a small amount of data (80 bits in this example).

Subsequent to generating the IQ motion data, the system can assemble an IQ-data-reporting message (operation 316). The IQ-data-reporting message can be a compact data packet that includes information related to the center frequency used for the IQ measurements, the IQ density data, and the IQ motion data. Due to the compact representation of the IQ motion data, the IQ-data-reporting message can have a short length. In some embodiments, the size of the IQ-data-reporting message can be less than 340 bytes, making it possible to transmit the IQ-data-reporting message over a bandwidth-limited channel, such as a satellite communication channel. The IQ-data-reporting message can also include the percentage of IQ points included in the bins, which can provide information related to the confidence level of the reporting message. The confidence level is higher when a greater percentage of IQ points are included in the reporting message. As discussed previously, certain IQ points are not included in the bins; hence, density or motion information of these IQ points will not be included in the IQ-data-reporting message. When these outside IQ points are sparsely scattered, they carry less information associated with the detected RF signals, and therefore not including them in the constellation bin density data can be an acceptable way to reduce message size.

The system can also generate IQ-data-reporting messages for other center frequencies, when applicable. For example, if multiple peaks exist in the RF power spectrum, an IQ-data-reporting message can be generated for each peak. The system can then transmit the IQ-data-reporting messages, via a bandwidth-limited communication channel, to a remote server (operation 318). Information included in the IQ-data-reporting messages can be used to determine characteristics (e.g., modulation schemes, signal patterns, etc.) associated with the detected RF signals. In some embodiments, machine-learning or artificial intelligence (AI)-based techniques, including deep neural networks, can be used to compute fingerprints from the IQ-data-reporting messages. Such fingerprints can then be used to associate the IQ data with classes of transmitters. For example, a machine-learning or AI module can be trained using supervised learning techniques based on IQ data collected from known transmitters. Alternatively, the machine-learning or AI module can be trained using unlabeled data known to include signal types of interest, using unsupervised and self-supervised machine-learning techniques (e.g. clustering analysis).

Figure 5:
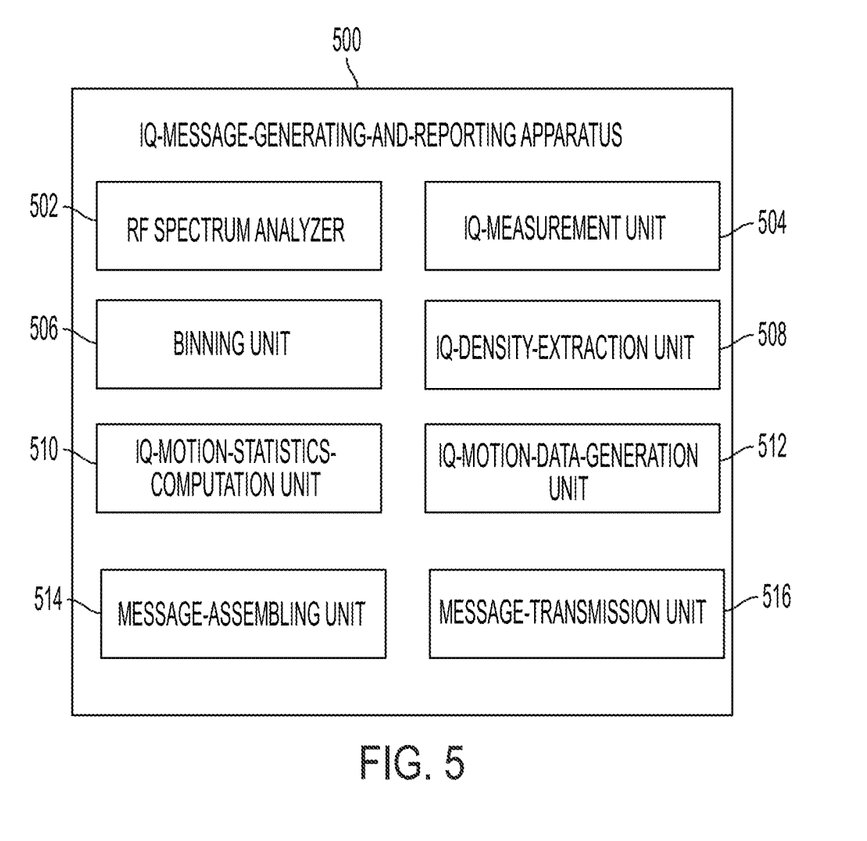
FIG. 5 illustrates an exemplary IQ-message-generating- and reporting apparatus, according to one embodiment.

FIG. 5 illustrates an exemplary IQ-message-generating-and reporting apparatus, according to one embodiment. IQ-message-generating-and reporting apparatus 500 can be residing on a floating device, which belongs to a network of floating devices distributed in the ocean to collect various types of environmental data.

IQ-message-generating-and reporting apparatus 500 can include an RF spectrum analyzer 502, an IQ-measurement unit 504, a binning unit 506, an IQ-density-extraction unit 508, an IQ-motion-statistics-computation unit 510, an IQ-motion-data-generation unit 512, a message-assembling unit 514, and a message-transmission unit 516.

RF spectrum analyzer 502 measures the RF spectrum in the environment. In some embodiments, RF spectrum analyzer 502 can first perform measurement over a wide spectrum range to identify one or more spectral peaks, and then it can perform a narrowband measurement at a higher resolution to accurately determine the center frequency of an RF peak. In some embodiments, RF spectrum analyzer 502 can include a software-defined radio receiver.

IQ-measurement unit 504 can perform IQ measurements based at the determined center frequency to obtain IQ data. In some embodiments, IQ-measurement unit 504 can include a software-defined radio receiver.

Binning unit 506 can divide a selected area of the IQ plane into a 2D array of bins based on the obtained IQ data. IQ-density-extraction unit 508 can extract IQ density data based on the IQ measurements and the bins in the IQ plane. More specifically, IQ-density-extraction unit 508 counts the number of IQ points included in each bin. The extracted IQ-density data can include a 2D array corresponding to the 2D array of bins.

IQ-motion-statistics-computation unit 510 can compute motion statistics for IQ points in each bin, including the average distance, the standard deviation of the distance, and the average angle. IQ-motion-data-generation unit 512 can generate a bit string of a predetermined length for each bin based on the motion statistics. In some embodiments, the bit string can include five bits, with one bit for the average distance, one bit for the standard deviation of distance, and three bits for the average angle. The bit string may also have a different format. For example, the number of bits used to represent the average distance or the standard deviation may be more than one (e.g., two or three bits). Similarly, the number of bits used to represent the average angle may be greater or less than three bits. In addition, other motion statistics (e.g., the standard deviation of the angles) may also be included, or certain motion statistics (e.g., the standard deviation of the distances) can be excluded. The bit strings for all the bins can form a 2D array corresponding to the 2D array of bins.

Message-assembling unit 514 can assemble one or more IQ-data-reporting messages. An IQ-data-reporting message can include various types of information associated with the IQ data. In one embodiment, the IQ-data-reporting message can include the IQ-density data and the IQ-motion data. As disclosed before, each data piece can be a 2D array corresponding to the 2D array of bins. The IQ-data-reporting message can further include the center frequency and optionally the percentage of IQ points being reported (i.e., the percentage of the IQ points included in the bins). Depending on the particular communication protocol implemented, appropriate packet headers can be added as part of the message. Message-transmission unit 516 can transmit the assembled IQ-data-reporting messages. In some embodiments, such messages are compact, with their size being less than a required size (e.g., a few hundreds bytes), thus allowing the messages to be transmitted to a remote server over a bandwidth-limited communication channel (e.g., a satellite channel). In one embodiment, message-transmission unit 516 can include a satellite transmitter (e.g., an Iridium satellite modem).

IQ Data Visualization

In some embodiments, upon receiving the IQ-data-reporting message, the remote server can present, on a display device to an analyst, graphic representations of the IQ information included in the IQ-data-reporting message, thus facilitating the analyst to make certain determinations regarding the RF signals from which the IQ data is extracted.

Figure 6A:
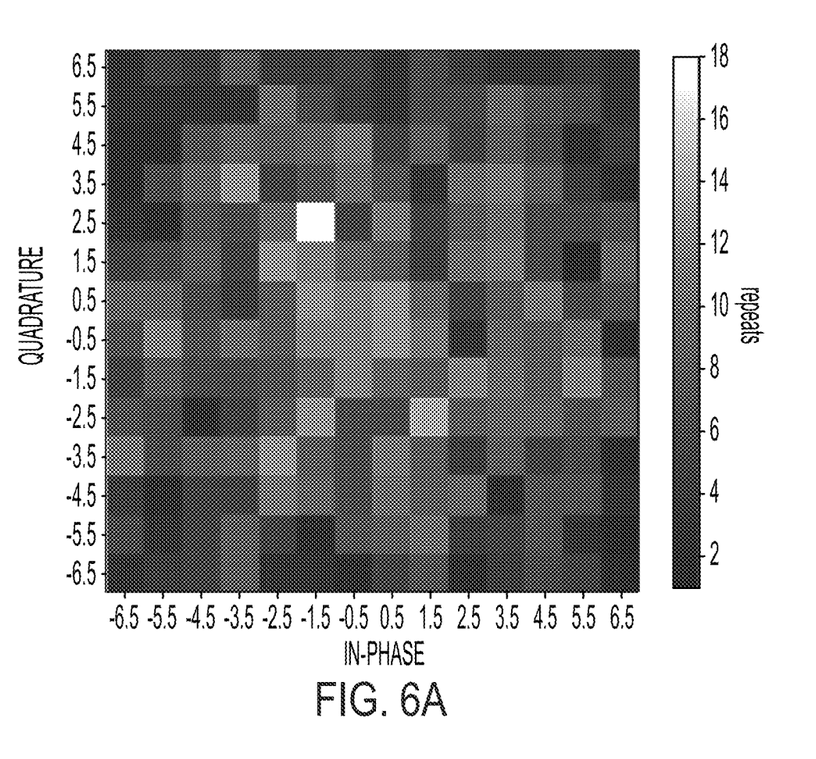
FIG. 6A illustrates a color map of the IQ density, according to one embodiment.

FIG. 6A illustrates a color map of the IQ density, according to one embodiment. In FIG. 6A, a 2D array (e.g., a 7×7 array) of bins is created on the IQ plane. Each bin is assigned a different shade to indicate the number of IQ points in the bin. A darker color indicates a larger number of IQ points in the bin, whereas a lighter color indicates a smaller number of IQ points in the bin. This color map can be generated based on the IQ density data included in the IQ-data-reporting message. The visualization of the density data can allow the analyst to quickly determine certain characteristics (e.g., modulation scheme) associated with the RF signals.

Figure 6B:
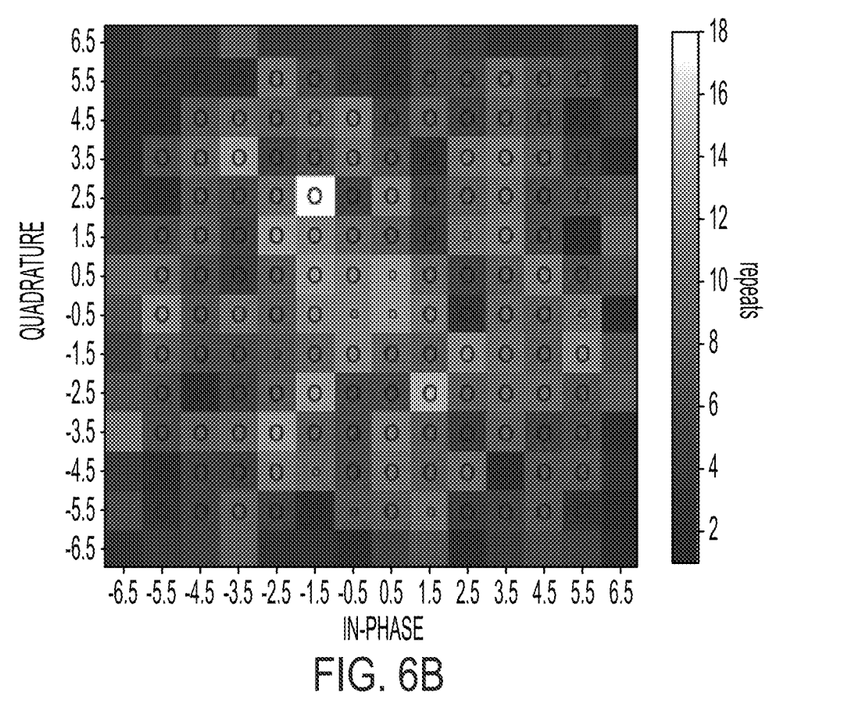
FIG. 6B illustrates a scheme to visualize motions of the IQ bins, according to one embodiment.

In addition to the density, motion information included in the IQ-data-reporting message can also be visualized. FIG. 6B illustrates a scheme to visualize motions of the IQ bins, according to one embodiment. FIG. 6B illustrates a 2D array of IQ bins with their IQ densities represented using different shades, similar to what is shown in FIG. 6A. In addition, a circle of a particular size is drawn over each bin to indicate the average motion or average distance of the IQ points in the bin. In the example, a single bit is used to represent the average distance traversed over one time step by the IQ points in each bin. Accordingly, the circles can have two sizes, with the larger circle representing a bit "1" and the smaller circle representing a bit "0." As discussed previously, "1" means that the average distance is greater than a predetermined threshold value, and "0" means that the average distance is smaller than the predetermined threshold value. The threshold has been determined based on the practical need. In the example shown in FIG. 6B, the threshold value for the distance can be 2.9 unit lengths, with the unit length being the length of the side of each bin. Note that the motion data for bins at the outmost rows and columns are not included in the IQ-data-reporting message for the embodiment shown in FIG. 6B. Hence, no circle is drawn in the bins at the outmost rows and columns. This is a choice that can be made to reduce the size of the IQ-data-reporting message.

Figure 6C:
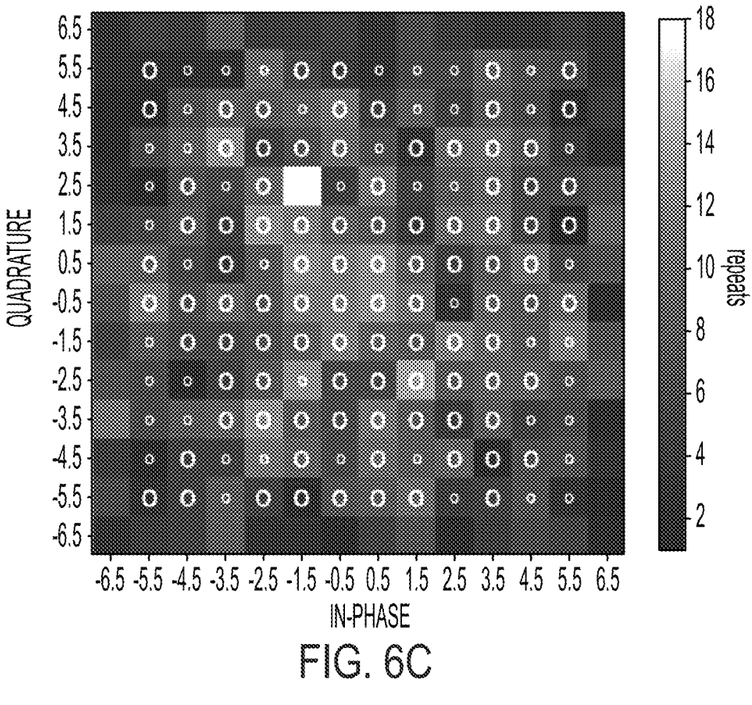
FIG. 6C illustrates a scheme to visualize the standard deviation of motion of the IQ bins, according to one embodiment.

FIG. 6C illustrates a scheme to visualize the standard deviation of motion of the IQ bins, according to one embodiment. FIG. 6C is similar to FIG. 6B with a circle drawn in each bin, except that, in FIG. 6C, the size of the circle indicates whether the standard deviation of the distance for IQ points in the bin is greater or smaller than a predetermined threshold value.

Figure 6D:
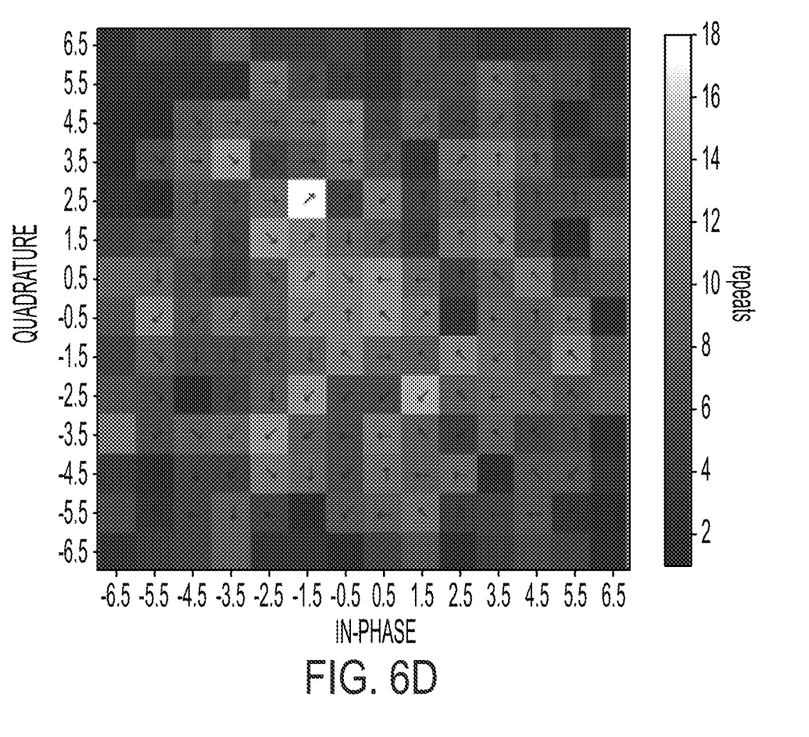
FIG. 6D illustrates a scheme to visualize the directions of motion of the IQ bins, according to one embodiment.

FIG. 6D illustrates a scheme to visualize the directions of motion of the IQ bins, according to one embodiment. FIG. 6D is similar to FIG. 6B and FIG. 6C, except that, in FIG. 6D, an arrow is drawn in each bin to indicate the average direction of movement of IQ points in the bin. More specifically, the direction pointed by the arrow is the average direction. In this example, three bits are used to represent the average movement direction of the IQ points in each bin. Consequently, the arrows can point to eight different directions (e.g., north, east, south, west, northeast, southeast, southwest, and northwest).

In addition to presenting the different types of IQ information in different graphics, such as graphics shown in FIGS. 6A-6D, in some embodiments, different types of IQ information can be combined in a same graphic. For example, the distance information and the direction information can be combined by drawing both a circle and an arrow in each bin. Other visualization schemes can also be possible. For example, instead of circles, the average distance or the standard deviation of distance can be represented using other geometric shapes (e.g., squares, stars, etc.). Using graphics to represent the IQ information visually can allow a human analyst to make a quick decision regarding the RF signals. In addition, trained artificial intelligence (AI) may also be used to examine such visual representations (e.g., the ones shown in FIGS. 6A-6D) to draw conclusions regarding the source of the detected RF signals. For example, an AI module can first be trained using graphics of IQ data collected from known transmitters, and the trained AI module can then analyze a new graphic to determine the type of transmitter associated with the IQ data shown in the new graphic. Examining such visualizations by an AI can refer to the AI examining data objects or computer files that can be used to create graphics, even if no actual graphical image is generated during the examination.

Figure 7:
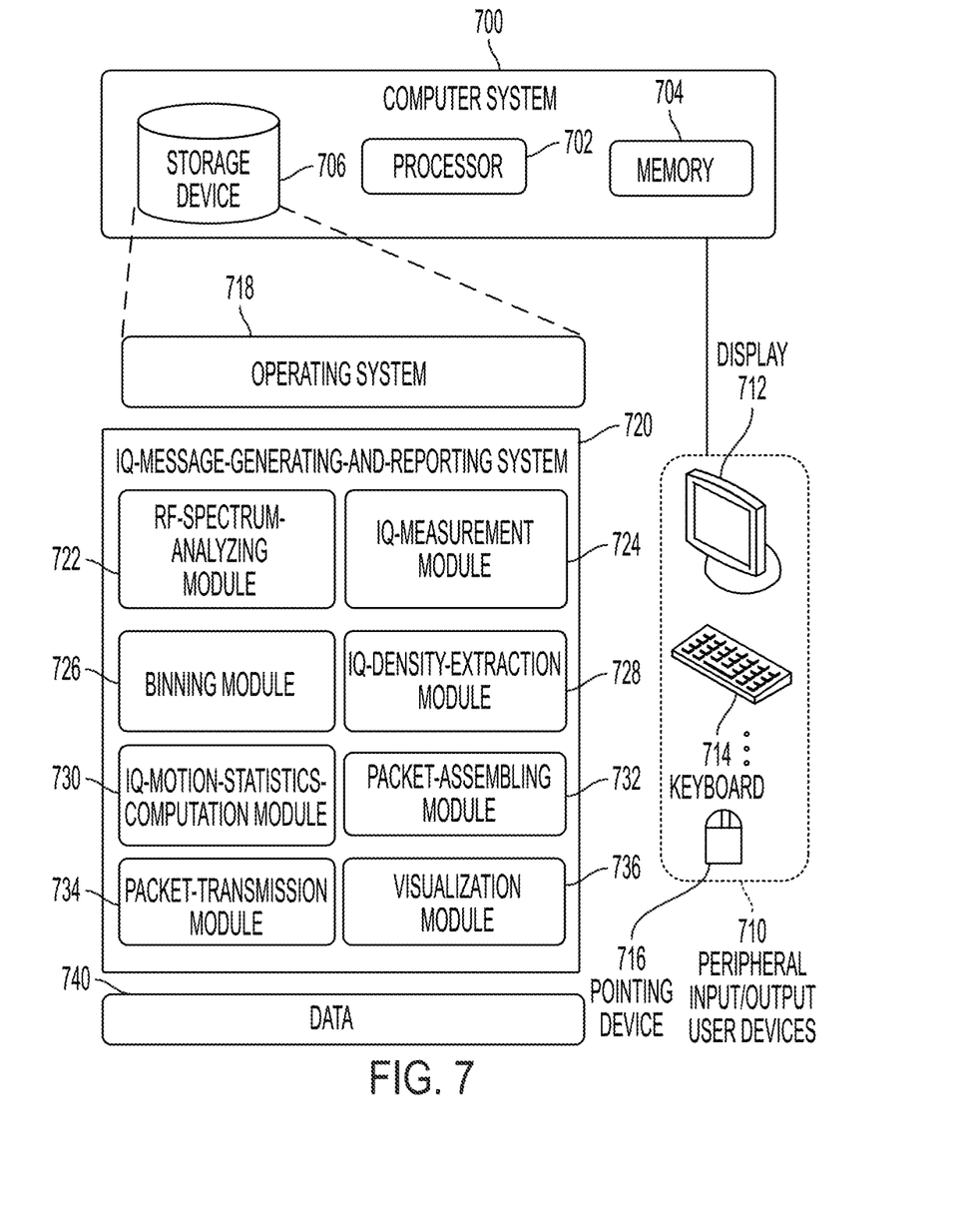
FIG. 7 illustrates an exemplary computer system, according to one embodiment.

FIG. 7 illustrates an exemplary computer system, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 718, an IQ-message-generating-and-reporting system 720, and data 740.

IQ-message-generating-and-reporting system 720 can include instructions, which when executed by computer system 700, can cause computer system 700 or processor 702 to perform methods and/or processes described in this disclosure. Specifically, IQ-message-generating-and-reporting system 720 can include instructions for analyzing RF spectrums (RF-spectrum-analyzing module 722), instructions for performing IQ measurements (IQ-measurement module 724), instructions for creating a number of bins in the IQ plane (binning module 726), instructions for extracting IQ density data (IQ-density-extraction module 728), instructions for computing IQ motion statistics (IQ-motion-statistics-computation module 730), instructions for assembling IQ-data-reporting packets (packet-assembling module 732), instructions for transmitting IQ-data-reporting packets (packet-transmission module 734), and instructions for visualizing the IQ information based on the IQ-data-reporting message (visualization module 736).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices, such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for detecting and reporting information associated with radio frequency (RF) signals, the method comprising:
    obtaining in-phase and quadrature (IQ) data of the RF signals received at a predetermined center frequency by an RF receiver;
    computing statistics associated with time-dependent changes of the IQ data, which comprises:
        placing IQ data points included in the IQ data into a plurality of bins in an IQ plane;
        computing, for each IQ data point, a change in position in the IQ plane between the IQ data point and a corresponding IQ data point recorded prior to a predetermined time interval; and
        computing, for each bin, an average change in position of IQ data points inside the bin;
    assembling a data packet to be transmitted over a bandwidth-limited communication channel, wherein the data packet includes a small number of bits representing the computed statistics associated with the time-dependent changes of the IQ data.

2. The computer-implemented method of claim 1, wherein the change in position comprises: a distance between the IQ data point and the corresponding IQ data point recorded prior to the predetermined time interval, and a direction pointed to the IQ data point from the corresponding IQ data point; and
    wherein the average change in position for each bin comprises an average distance and an average direction.

3. The computer-implemented method of claim 2, wherein computing the statistics associated with the time-dependent changes of the IQ data further comprises:
    computing, for each bin, a standard deviation of the distance associated with the IQ data points in the bin.

4. The computer-implemented method of claim 3, further comprising generating a bit string to represent statistics associated with the time-dependent changes of the IQ data points in a respective bin, wherein the bit string includes one or more of: a first set of bits representing the average distance, a second set of bits representing the standard deviation of the distance, and a third set of bits representing the average direction.

5. The computer-implemented method of claim 4, wherein:
    the first set of bits comprises a single bit indicating whether the average distance is greater or less than a first predetermined threshold;
    the second set of bits comprises a single bit indicating whether the standard deviation of the distance is greater or less than a second predetermined threshold; and
    the third set of bits comprises three bits indicating an angle value associated with the average direction.

6. The computer-implemented method of claim 1, wherein
    determining the center frequency comprises:
        performing a wideband RF power measurement to locate a peak; and
        performing a narrowband RF power measurement around the peak and analyzing the narrowband measurement results to determine a center frequency of interest.

7. The computer-implemented method of claim 1, wherein the RF receiver resides on a floating device floating in an ocean, and wherein the bandwidth-limited communication channel comprises a satellite communication channel.

8. The computer-implemented method of claim 1, further comprising:
    receiving, at a remote server over the bandwidth-limited communication channel, the data packet; and
    presenting, on a display, a visual representation of the IQ data based on information included in the data packet.

9. The computer-implemented method of claim 8, further comprising: applying a machine-learning technique to derive information regarding a source of the RF signals based on the visual representation of the IQ data.

10. The computer-implemented method of claim 8, wherein the visual representation comprises one or more of:
    a color map representing density information associated with distribution of the IQ data points in the IQ plane; and
    one or more geometric shapes representing the statistics associated with the time-dependent changes of the IQ data.

11. A computer system for detecting and reporting information associated with radio frequency (RF) signals, the computer system comprising:
    a processor; and
    a storage device coupled to the processor and storing instructions, which when executed by the processor cause the processor to perform a method, the method comprising:
    obtaining in-phase and quadrature (IQ) data of the RF signals received at a predetermind center frequency by an RF receiver; computing statistics associated with time-dependent changes of the IQ data, which comprises:
        placing IQ data points included in the IQ data into a plurality of bins in an IQ plane;
        computing, for each IQ data point, a change in position in the IQ plane between the IQ data point and a corresponding IQ data point recorded prior to a predetermined time interval; and computing, for each bin, an average change in position of IQ data points inside the bin; and assembling a data packet to be transmitted over a bandwidth-limited communication channel, wherein the data packet includes a small number of bits representing the computed statistics associated with the time-dependent changes of the IQ data.

12. The computer system of claim 11, wherein the change in position comprises: a distance between the IQ data point and the corresponding IQ data point recorded prior to the predetermined time interval, and a direction pointed to the IQ data point from the corresponding IQ data point; and wherein the average change in position for each bin comprises an average distance and an average direction.

13. The computer system of claim 12, wherein computing the statistics associated with the time-dependent changes of the IQ data further comprises computing, for each bin, a standard deviation of the distance associated with the IQ data points in the bin.

14. The computer system of claim 13, wherein the method further comprises generating a bit string to represent statistics associated with the time-dependent changes of the IQ data points in a respective bin, wherein the bit string includes one or more of: a first set of bits representing the average distance, a second set of bits representing the standard deviation, and a third set of bits representing the average direction.

15. The computer system of claim 14, wherein:

the first set of bits comprises a single bit indicating whether the average distance is greater or less than a first predetermined threshold;

the second set of bits comprises a single bit indicating whether the standard deviation of the distance is greater or less than a second predetermined threshold; and the third set of bits comprises three bits indicating an angle value associated with the average direction.

16. The computer system of claim 11, wherein determining the center frequency comprises:

performing a wideband RF power measurement to locate a peak; and performing a narrowband RF power measurement around the peak and analyze the narrowband measurement results to determine a center frequency of interest.

17. The computer system of claim 11, wherein the RF receiver resides on a floating device floating in an ocean, and wherein the bandwidth-limited communication channel comprises a satellite communication channel.

18. The computer system of claim 11, wherein the method further comprises:

receiving, at a remote server over the bandwidth-limited communication channel, the data packet; and presenting, on a display, a visual representation of the IQ data based on information included in the data packet.

19. The computer system of claim 18, wherein the method further comprises applying a machine-learning technique to derive information regarding a source of the RF signals based on the visual representation of the IQ data.

20. The computer system of claim 19, wherein the visual representation comprises one or more of:

a color map representing density information associated with distribution of the IQ data points in the IQ plane; and one or more geometric shapes representing the statistics associated with the time-dependent changes of the IQ data.

\* \* \* \* \*